United States Patent
Khan et al.

(10) Patent No.: US 8,370,797 B2
(45) Date of Patent: Feb. 5, 2013

(54) DATA PROCESSING APPARATUS, METHOD THEREFOR, AND COMPUTER PROGRAM

(75) Inventors: Md. Ashfaquzzaman Khan, Brighton, MA (US); Yasushi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 12/487,799

(22) Filed: Jun. 19, 2009

(65) Prior Publication Data
US 2009/0319986 A1    Dec. 24, 2009

(30) Foreign Application Priority Data
Jun. 20, 2008  (JP) .................................. 2008-161516

(51) Int. Cl.
*G06F 9/44*  (2006.01)

(52) U.S. Cl. ........ 717/106; 717/126; 717/130; 717/136; 717/139; 716/108; 716/113; 712/233

(58) Field of Classification Search ........................ None
See application file for complete search history.

(56) References Cited

U.S. PATENT DOCUMENTS

| | | | | |
|---|---|---|---|---|
| 4,536,840 A * | 8/1985 | Borta | ............................. | 717/106 |
| 5,287,511 A * | 2/1994 | Robinson et al. | ............. | 717/106 |
| 5,854,924 A * | 12/1998 | Rickel et al. | .................. | 717/132 |
| 6,502,237 B1 * | 12/2002 | Yates et al. | ..................... | 717/136 |
| 6,606,588 B1 * | 8/2003 | Schaumont et al. | ............ | 703/15 |
| 6,775,020 B2 * | 8/2004 | Fukunaga et al. | ............ | 358/1.15 |
| 7,107,580 B2 * | 9/2006 | Zemach et al. | ................ | 717/136 |
| 7,613,599 B2 * | 11/2009 | Bade et al. | ........................ | 703/14 |
| 7,721,260 B2 * | 5/2010 | Short et al. | ...................... | 717/124 |
| 7,774,746 B2 * | 8/2010 | Mansfield et al. | ............. | 717/106 |
| 7,873,945 B2 * | 1/2011 | Musuvathi et al. | ........... | 717/124 |
| 8,146,066 B2 * | 3/2012 | Demetriou et al. | ............ | 717/149 |
| 2002/0019969 A1 * | 2/2002 | Hellestrand et al. | .............. | 716/5 |
| 2002/0108094 A1 * | 8/2002 | Scurry | ................................ | 716/5 |
| 2003/0196078 A1 * | 10/2003 | Wise et al. | ..................... | 712/300 |
| 2005/0010880 A1 * | 1/2005 | Schubert et al. | ................... | 716/4 |
| 2005/0149897 A1 * | 7/2005 | Yamashita et al. | .............. | 716/18 |
| 2006/0168101 A1 * | 7/2006 | Mikhailov et al. | ............ | 709/217 |

(Continued)

FOREIGN PATENT DOCUMENTS

| | | |
|---|---|---|
| JP | 2004-234528 | 8/2004 |
| JP | 2005-293219 | 10/2005 |

(Continued)

OTHER PUBLICATIONS

Timed compiled-code simulation of embedded software for performance analysis of SOC design, Lee et al, dated: 2002, source: IEEE.*

(Continued)

*Primary Examiner* — Chameli Das
(74) *Attorney, Agent, or Firm* — Wolf, Greenfield & Sacks, P.C.

(57) ABSTRACT

A data processing apparatus includes a host processing apparatus that can cooperatively verify, using generated Timed software, hardware and software of a semiconductor device mounted with a target processing device and an operating system (OS), wherein the host processing apparatus analyzes an assembler of the target processing device and recognizes a Basic Block, which is a basic unit for calculating information concerning time, and generates Timed software for the cooperative verification with reference to the Basic Block.

16 Claims, 3 Drawing Sheets

U.S. PATENT DOCUMENTS

| | | | |
|---|---|---|---|
| 2007/0261038 A1* | 11/2007 | Suba et al. | 717/136 |
| 2008/0127125 A1* | 5/2008 | Anckaert et al. | 717/136 |
| 2008/0320456 A1* | 12/2008 | Biswas et al. | 717/145 |
| 2010/0198799 A1* | 8/2010 | Krishnan et al. | 707/702 |
| 2011/0035733 A1* | 2/2011 | Horning et al. | 717/140 |

FOREIGN PATENT DOCUMENTS

| | | |
|---|---|---|
| JP | 2006-023852 | 1/2006 |

OTHER PUBLICATIONS

Assessing and improving testing of real-time software using simulation, Henry, J et al, source: IEEE, dated: 2003.*

Lajolo, Marcello et al., "A Compilation-based Software Estimation Scheme for Hardware/Software Co-Simulation", $7^{th}$ International Workshop on Hardware/Software Co-design, Rome, Italy, May 3, 1999, pp. 85-89; XP-000903907.

Bammi, Jwahar et al., "Software Performance Estimation Strategies in a System-Level Design Tool", $8^{th}$ International Workshop on Hardware/Software Co-design, San Diego, CA, USA, May 3, 2000, pp. 82-86; XP000966204.

Lazarescu, Mihai T. et al., "Compilation-based Software Performance Estimation for System Level Design", IEEE International, Nov. 8, 2000, Piscataway, NJ, USA, pp. 167-172; XP010527536.

* cited by examiner

FIG.4A    FIG.4B    FIG.4C    FIG.4D    FIG.4E    FIG.4F

| ORIGINAL SOURCE CODE | ASSEMBLER | NUMBER OF CYCLES | EXISTING METHOD | FIRST METHOD | SECOND METHOD |
|---|---|---|---|---|---|
| if(a!=x && b!=x){<br>  TaskA;<br>}<br>else{<br>  TaskB;<br>} | cmp a, x;<br>bz L1;<br>cmp b, x;<br>bz L1;<br>TaskA;<br>b L2;<br>L1:<br>TaskB;<br>L2: | 1<br>1<br>1<br>1<br>aT<br>1<br>bT | wait(t1);<br>if(a!=x && b!=x){<br>  wait(t2);<br>  TaskA;<br>  wait(t3);<br>}<br>else{<br>  wait(t4);<br>  TaskB;<br>  wait(t5);<br>} | wait(2);<br>if(a!=x){<br>  wait(2);<br>  if (b!=x){<br>    TaskA; wait(aT+1);<br>  } else{<br>    TaskB; wait(bT);<br>  }<br>} else{<br>  TaskB; wait(bT);<br>} | wait(2);<br>if (a == x)) goto L1;<br>wait(2);<br>if (b == x)) goto L1;<br>TaskA;<br>wait(aT+1);<br>goto L2;<br>L1:<br>TaskB;<br>wait(bT);<br>L2: |

US 8,370,797 B2

DATA PROCESSING APPARATUS, METHOD THEREFOR, AND COMPUTER PROGRAM

CROSS REFERENCE TO RELATED APPLICATIONS

The present application claims priority under 35 U.S.C. §119 to, and contains subject matter related to that disclosed in, Japanese Priority Patent Application JP2008-061516, filed in the Japan Patent Office on Jun. 20, 2008, the entire contents of which are hereby incorporated by reference.

BACKGROUND OF THE INVENTION

1. Field of the Invention

The present invention relates to a data processing apparatus, a method therefor, and a computer program that are applicable to cooperative verification of hardware (HW) and software (SW) ("Co-Verification" or "Co-Simulation") mounted on a semiconductor device.

2. Description of the Related Art

There is proposed a method of cooperatively verifying (Co-Verification), using a host CPU (host processing apparatus: "Co-Verification System" or "Co-Simulation System"), hardware and software of a semiconductor device mounted with one target CPU and one operating system (OS) (see, for example, JP-A-2004-234528).

This method includes first to fifth steps explained below.

In the first step, the host CPU inputs and compiles a Timed software component described in a C-base language (for example, System C) as a verification model (a software model) and links the compiled Timed software component and a compiled hardware component.

In the second step, the host CPU inputs and compiles a test bench.

In the third step, the host CPU links the verification model processed in the first step and the test bench processed in the second step and generates an execution program.

In the fourth step, the host CPU executes simulation on the basis of the execution program generated in the third step.

In the fifth step, the host CPU outputs a result of the simulation in the fourth step.

As the first step, two kinds of processing explained below can be adopted.

First processing is processing as the first step for inputting a Timed software component of a binary code for host CPU as a verification model, inputting and compiling a hardware component described in a C-base language as a verification model, and linking the input Timed software component and the compiled hardware component.

Second processing is processing as the first step for inputting and compiling a Timed software component described in the C-base language as a verification model, inputting a Timed software component of a binary code for host CPU as a verification model, inputting and compiling a hardware component described in the C-base language as a verification model, and linking the compiled or input Timed software component and the compiled hardware component.

In the method disclosed in JP-A-2004-234528, when Timed software (a source code for simulation) is generated from Un-Timed software (original source code), a Basic Block is recognized with reference to an ANSI-C based source code or a binary code for host CPU.

For example, the original source code is illustrated as the Un-Timed software and the source code for simulation is illustrated as the Timed software.

SUMMARY OF THE INVENTION

In the method explained above, when the Timed software is generated from the Un-Timed software, a code for simulating time information is added to control points (start and end of a Basic Block) of the ANSI-C based source code or the binary code for host CPU. Otherwise, basically, a configuration of the original code is not changed.

As explained above, concerning the method of generating the Timed software from the Un-Timed software (the original source code) in the simulation employing the Timed software and the hardware model, the source code is not changed in the existing technique.

For the simulation, cycle number information or the like is only added to the original source code.

However, in the method of not changing the source code, the number of cycles of a target CPU may not be able to be accurately represented depending on a way of writing a code. For example, when there are two or more determination conditions of an if sentence, it is difficult to accurately represent the number of cycles.

It is difficult to accurately represent various kinds of optimization of a compiler, specifically, inline expansion of a function, Loop Unroll, and a change in an execution order.

As a result, there is a disadvantage that accuracy of simulation falls, an error occurs in evaluation of software and hardware, and there are items that may be unable to be evaluated such as a branch hit mistake.

Therefore, it is desirable to provide a data processing apparatus, a method therefor, and a computer program that can cope with optimization of a compiler, can add a code for information collection, and can realize improvement of simulation accuracy.

According to an embodiment of the present invention, there is provided a data processing apparatus including a host processing apparatus that can cooperatively verify, using generated Timed software, hardware and software of a semiconductor device mounted with a target processing device and an operating system (OS). The host processing apparatus analyzes an assembler of the target processing device and recognizes a Basic Block, which is a basic unit for calculating information concerning time, and generates Timed software for the cooperative verification with reference to the Basic Block.

Preferably, the host processing apparatus analyzes the assembler and generates a source code changed to reflect cycle number information.

Preferably, the host processing apparatus generates a source code of a high level to make it possible to accurately use cycle number information from the assembler.

Preferably, the high level is the C language, and, when the data processing apparatus reads an assembler file and recognizes a function start command, converts an assembler command into a definition of a C function and outputs the assembler command to a C file, inserts time information in the C file, and starts processing from a new Basic Block.

Preferably, when the data processing apparatus reads the assembler file, updates the time information, and recognizes a branch start/end command, the data processing apparatus inserts the time information in the C file, converts the assembler command into the C language and outputs the assembler command to the C file, finishes processing of an immediately preceding Basic Block, and starts the processing from the new Basic Block.

Preferably, when the data processing apparatus reads the assembler file, updates the time information, and recognizes a function end command, the data processing apparatus inserts the time information in the C file, converts the assembler command into C function end and outputs the assembler command to the C file, and finishes processing of an immediately preceding Basic Block.

Preferably, when the data processing apparatus may not be able to recognize the branch start/end command and the function end command, the data processing apparatus converts the assembler command into the C language and repeats the processing from the processing for reading the assembler file.

According to another embodiment of the present invention, there is provided a data processing method including the steps of: in generating Timed software used for cooperative verification of hardware and software of a semiconductor device mounted with a target processing device and an operating system (OS), analyzing an assembler of the target processing device and recognizing a Basic Block, which is a basic unit for calculating information concerning time; and generating Timed software for the cooperative verification with reference to the Basic Block.

According to still another embodiment of the present invention, there is provided a computer program for causing a computer to execute data processing including: in generating Timed software used for cooperative verification of hardware and software of a semiconductor device mounted with a target processing device and an operating system (OS), processing for analyzing an assembler of the target processing device and recognizing a Basic Block, which is a basic unit for calculating information concerning time; and processing for generating Timed software for the cooperative verification with reference to the Basic Block.

According to the embodiments of the present invention, the host processing apparatus analyzes an assembler of the target processing device and recognizes a Basic Block (control points), which is a basic unit for calculating information concerning time.

The host processing apparatus generates Timed software for cooperative verification with reference to the Basic Block.

According to the embodiments of the present invention, it is possible to cope with optimization of a compiler, add a code for information collection, and realize improvement of simulation accuracy.

BRIEF DESCRIPTION OF THE DRAWINGS

FIGS. 4A to 4F are diagrams for explaining effects of methods according to the embodiment in comparison with an existing method.

DESCRIPTION OF THE PREFERRED EMBODIMENTS

An embodiment of the present invention is explained below with reference to the accompanying drawings.

Figure 1:
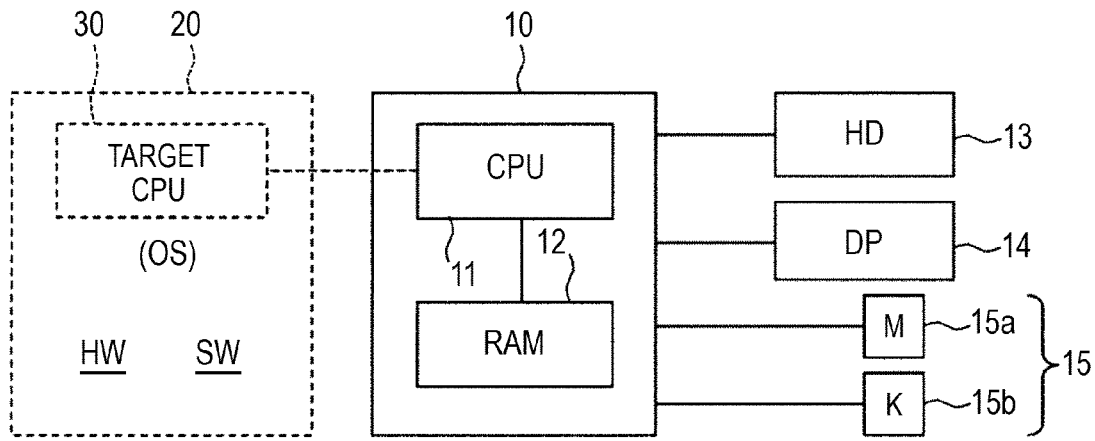
FIG. 1 is a block diagram of a configuration example of a computer system that adopts a data processing apparatus according to an embodiment of the present invention.

FIG. 1 is a block diagram of a configuration example of a computer system that adopts a data processing apparatus according to the embodiment of the present invention.

Figure 2:
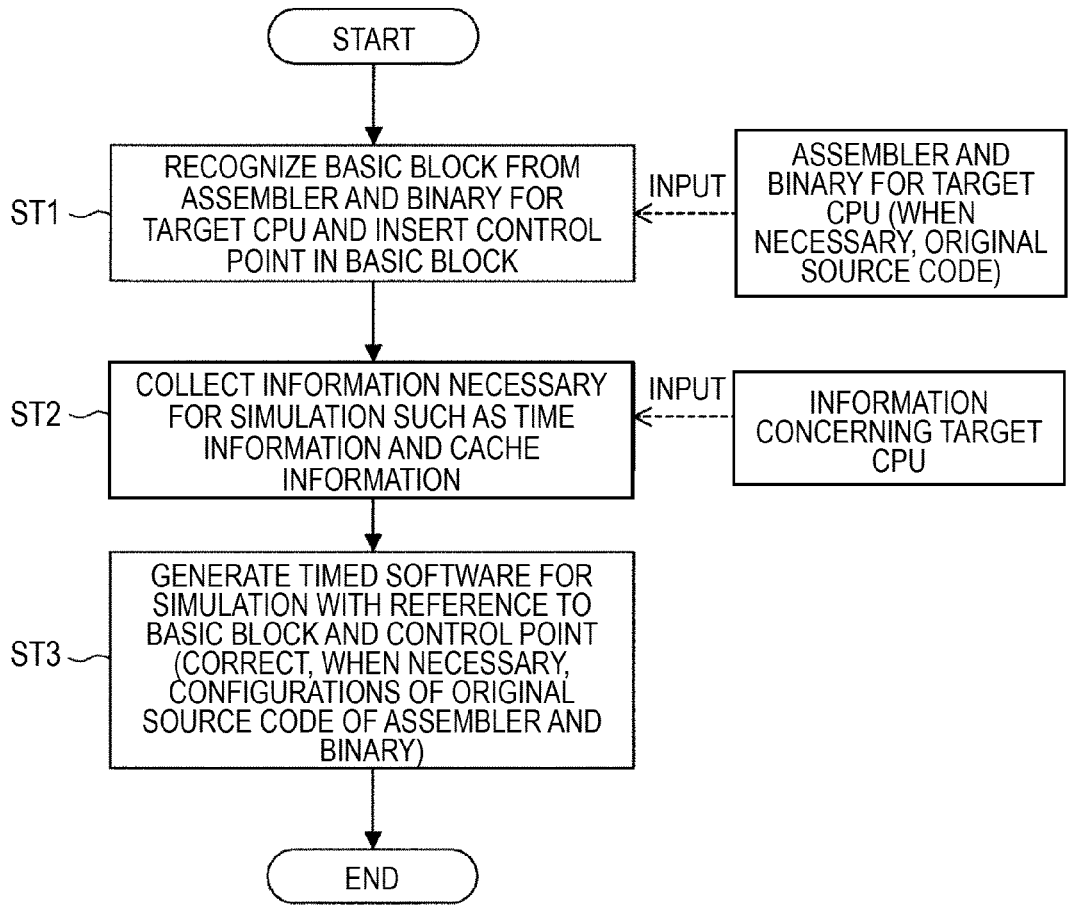
FIG. 2 is a flowchart of an overview of basic operation of the computer system shown in FIG. 1.

FIG. 2 is a flowchart of an overview of basic operation of the computer system shown in FIG. 1.

A computer system 1 includes a computer main body 10.

The computer main body 10 is configured as an EDA (Electronic Design Automation) apparatus including a central processing unit (CPU) 11 serving as a host processing apparatus that can execute a computer program, which is implementation of the flowchart shown in FIG. 2, and a main storage device (a RAM or a ROM) 12 in which the computer program or a part of the computer program is loaded.

The computer main body 10 can also include, when necessary, an external storage device (HD) 13 including a hard disk device, a display device (DP) 14 such as a display, and user interfaces 15 such as a mouse (M) 15a and a keyboard (K) 15b.

Basically, the CPU 11 functions as a host CPU.

The CPU 11 recognizes a Basic Block from an assembler and a binary for a target CPU 30, which is a target processing device, mounted on a semiconductor device 20 of a verification target SoC (System on Chip) and inserts control points in the Basic Block (step ST1 in FIG. 2).

In this way, the CPU 11 recognizes the Basic Point from the assembler and the binary for the target CPU 30 and, when necessary, an original source code.

The CPU 11 has a function of recognizing the Basic Block on the basis of the assembler and, when necessary, changing a configuration of a source code or generating a new source code to generate Timed software.

In this embodiment, the CPU 11 has a function of determining, on the basis of the assembler, not only time information but also where in a code for simulation the information is inserted.

"Basic Block" indicates a basis unit for calculating information concerning time. When a method according to this embodiment is used, simulation more accurate than the existing technique can be performed. Further, items that may not be able to be accurately calculated by the existing technique can be properly calculated.

The CPU 11 collects information concerning a target CPU necessary for simulation such as time information, cache information (step ST2 in FIG. 2).

The CPU 11 generates Timed software for simulation with reference to the Basic Block and the control points. Specifically, the CPU 11 corrects, when necessary, configurations of the original source code of the assembler and the binary or generates a new code (step ST3 in FIG. 2).

In this way, the computer main body 10 according to this embodiment "analyzes the assembler and generates a source code changed to accurately reflect cycle number information and the like" or "generates a source code of a high level (the C language, etc.) from the assembler such that the cycle number information and the like can be accurately used".

Consequently, the computer main body 10 generates Timed software from Un-Timed software (the original source code).

In short, the computer main body 10 determines the Basic Block according to assembler analysis rather than the existing method of determining the Basic Block only with a source code and adding cycle information to the Basic Block and generates a source code adapted to the Basic Block.

In other words, in this embodiment, the computer main body 10 creates a simulation (verification) model (a software model) having both high accuracy by a model formed by a relatively low-level language such as the assembler and high speed by a model formed by a high-level language such as the C language.

The computer main body 10 performs predetermined simulation processing based on the generated Timed software.

This embodiment has a characteristic in the technique for generating Timed software from Un-Timed software with reference to the assembler. Therefore, specific explanation concerning this simulation is omitted.

Since the computer system 1 is used as the EDA apparatus, it is possible to accurately represent an if sentence conditional branch in software (SW)/hardware (HW) cooperative design verification. Therefore, simulation accuracy is improved from that in the existing method.

Moreover, it is possible to measure items that may not be able to be measured by the existing method such as a branch hit mistake. Therefore, it is possible to cope with optimization of a compiler.

Further, actually, if there are models of software and hardware for a target CPU, simulation is possible even if there is no test bench.

Specific processing for generating a C source with time accuracy from assembler description, which is a characteristic of this embodiment, is explained with reference to FIG. 3.

Figure 3:
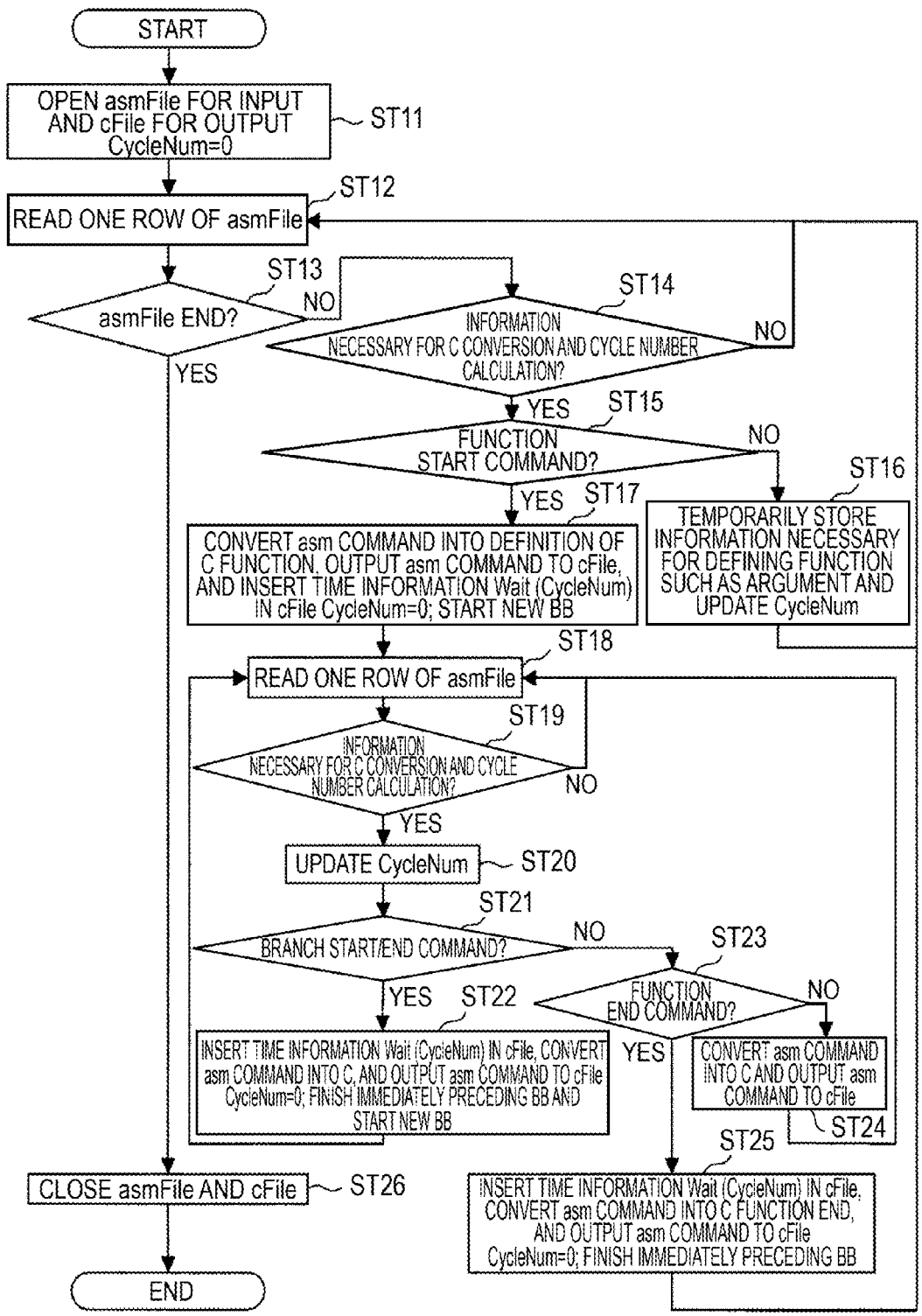
FIG. 3 is a flowchart of a processing procedure for generating a C source with time accuracy from assembler description.

FIG. 3 is a flowchart of a processing procedure for generating a C source with time accuracy from assembler description.

In FIG. 3, "asmFile" indicate a file in which an assembler is described and "cFile" indicates a C source with time accuracy.

Assembler commands (asm commands) are classified into the following three types:

1. commands for defining function start and end;
2. branch commands (BE, BNE, etc.) other than those related to function definition; and
3. general commands (ADD, SUB, etc.) other than the above.

Target architecture information is used for cycle number calculation (CycleNum). A table and the like for conversion from asm to C are separately prepared (go to description is used). "BB" means Basic Block.

<Step ST11>

In step ST11, the CPU 11 opens an asmFile for input and a cfile for output. The CPU 11 sets a value of cycle number calculation to 0, i.e., CycleNum=0.

<Step ST12>

In step ST12, the CPU 11 reads one row of the assembler file asmFile.

<Step ST13>

In step ST13, the CPU 11 determines whether the assembler file asmFile ends.

When the CPU 11 determines in step ST13 that the assembler file asmFile does not end, the CPU 11 shifts to processing in step ST14.

<Step ST14>

In step ST14, the CPU 11 determines whether information of the assembler file asmFile is information necessary for the C conversion and the cycle number calculation.

When the CPU 11 determines in step ST14 that the information of the assembler file asmFile is not information necessary for the C conversion and the cycle number calculation such as a label, the CPU 11 returns to the processing in step ST12.

When the CPU 11 determines in step ST14 that the information of the assembler file asmFile is information necessary for the C conversion and the cycle number calculation, the CPU 11 shifts to processing in the next step ST15.

<Step ST15>

In step ST15, the CPU 11 determines whether the information is a function start command.

When the CPU 11 determines in step ST15 that the information is not the function start command, the CPU 11 shifts to processing in step ST16.

On the other hand, when the CPU 11 determines in step ST15 that the information is the function start command, the CPU 11 shifts to processing in step ST17.

<Step ST16>

In step ST16, the CPU 11 temporarily stores information necessary for function definition such as an argument. The CPU 11 updates CycleNum and returns to the processing in step ST12.

<Step ST17>

In step ST17, the CPU 11 converts an assembler command (asm command) into a definition of a C function and outputs the assembler command to the C file cfile.

The CPU 11 inserts time information Wait (CycleNum) in the C file cfile. The CPU 11 sets a value of cycle number calculation to 0, i.e., CycleNum=0. The CPU 11 clears the value of cycle number calculation and starts the processing from a new Basic Block (BB).

<Step ST18>

In step ST18, the CPU 11 reads one row of the assembler file asmFile.

<Step ST19>

In step ST19, the CPU 11 determines whether information of the assembler file asmFile is information necessary for the C conversion and the cycle number calculation.

When the CPU 11 determines in step ST19 that the information of the assembler file asmFile is not information necessary for the C conversion and the cycle number calculation such as a label, the CPU 11 returns to the processing in step ST18.

When the CPU 11 determines in step ST19 that the information of the assembler file asmFile is information necessary for the C conversion and the cycle number calculation, the CPU 11 shifts to processing in the next step ST20.

<Step ST20>

In step ST20, the CPU 11 updates a value (CycleNum) of the cycle number calculation.

<Step ST21>

In step ST21, the CPU 11 determines whether the information is a branch start/end command.

When the CPU 11 determines in step ST21 that the information is the branch start/end command, the CPU 11 shifts to processing in step ST22.

When the CPU 11 determines in step ST21 that the information is the branch start/end command, the CPU 11 shifts to processing in step ST23.

<Step ST22>

In step ST22, the CPU 11 inserts time information Wait (CycleNum) in the C file cfile.

The CPU 11 converts an assembler command (asm command) into the C language and outputs the assembler command to the C file cfile.

The CPU 11 sets a value of the cycle number calculation to 0, i.e., CycleNum=0. The CPU 11 clears the value of the cycle number calculation, finishes the immediately preceding Basic Block (BB), and starts the processing from a new Basic Block (BB).

<Step ST23>

In step ST23, the CPU 11 determines whether the information is a function end command.

When the CPU 11 determines in step ST23 that the information is not the function end command, the CPU 11 shifts to processing in step ST24.

When the CPU 11 determines in step ST23 that the information is the function end command, the CPU 11 shifts to processing in step ST25.

<Step ST24>

In step ST24, the CPU 11 converts an assembler command (asm command) into the C language, outputs the assembler command to the C file cfile, and returns to the processing in step ST18.

<Step ST25>

In step ST25, the CPU 11 inserts time information Wait (CycleNum) in the C file cfile.

The CPU 11 converts the assembler command (asm command) into C function end and outputs the assembler command to the C file cfile.

The CPU 11 sets a value of the cycle number calculation to 0, i.e., CycleNum=0. The CPU 11 clears the value of the cycle number calculation, finishes the immediately preceding Basic Block (BB), and returns to the processing in step ST12.

<Step ST26>

When the CPU 11 determines in step ST13 that the assembler file asmFile ends, the CPU 11 shifts to processing in step ST26.

In step ST26, the CPU 11 closes the assembler file asmFile and the C file cfile.

The host CPU 11 can cooperatively verify, using a verification model (a software model) generated as explained above, hardware and software of a semiconductor device mounted with a target CPU and one operating system (OS).

The cooperative verification includes first to fifth steps explained below.

In the first step, the host CPU 11 inputs and compiles a Timed software component described in a C-base language as a verification model (a software model) and links the compiled Timed software component and a compiled hardware component.

In the second step, the host CPU 11 inputs and compiles a test bench.

In the third step, the host CPU 11 links the verification model processed in the first step and the test bench processed in the second step and generates an execution program.

In the fourth step, the host CPU 11 executes simulation on the basis of the execution program generated in the third step.

In the fifth step, the host CPU 11 outputs a result of the simulation in the fourth step.

As explained above, actually, if there are models of software and hardware for a target CPU, simulation is possible even if there is no test bench.

As explained above, according to this embodiment, the CPU 11 "analyzes the assembler and generates a source code changed to accurately reflect cycle number information and the like" or "generates a source code of a high level (the C language, etc.) from the assembler such that the cycle number information and the like can be accurately used".

Consequently, the CPU 11 generates Timed software from Un-Timed software (the original source code).

In short, the CPU 11 determines the Basic Block according to assembler analysis rather than the existing method of determining the Basic Block only with a source code and adding cycle information to the Basic Block and generates a source code adapted to the Basic Block and outputs the source code. Therefore, it is possible to obtain effects explained below and shown in FIGS. 4A to 4F in comparison with the existing method.

FIGS. 4A to 4F are diagrams for explaining effects of methods according to this embodiment in comparison with an existing method.

An example of an original source code is shown in FIG. 4A. In this example, a source code having two or more determination conditions in conditional branch of an if sentence or the like.

Description by an assembler is shown in FIG. 4B.

Cycle number information is shown in FIG. 4C.

An existing method is shown in FIG. 4D.

Description by a first method according to this embodiment is shown in FIG. 4E. The first method includes an if-else statement that branches into two according to a condition.

Description by a second method according to this embodiment is shown in FIG. 4F. In the second method, as an example, a go to identifier is used.

(1) In the existing technique, as shown in FIG. 4A, when there are the two or more determination conditions in the conditional branch of an if sentence or the like, it is difficult to obtain accurate cycle information. For example, as shown in FIG. 4D, it is difficult to calculate an actual number of cycles no matter how a value of ti (i=1, 2, . . . , and 5) is changed.

On the other hand, according to this embodiment, it is possible to obtain accurate cycle information.

(2) In the existing technique, it is difficult to cope with optimization of a compiler such as inline expansion of a function, Loop Unroll, and a change in execution order. However, according to this embodiment, it is possible to cope with optimization of a compiler.

(3) A source code is changed or a new source code is generated. Therefore, it is possible to add a code for collection of information necessary for tuning such as a branch hit mistake.

(4) Moreover, since Native simulation from a high-level language (C-language based, etc.) is performed, simulation speed does not fall.

The method explained above in detail can also be formed as a computer program corresponding to the procedure and executed by a computer such as a CPU.

Such a computer program can be recorded in a recording medium such as a semiconductor memory, a magnetic disk, an optical disk, or a floppy (registered trademark) disk and accessed by a computer in which the recording medium is set.

The present application contains subject matter related to that disclosed in Japanese Priority Patent Application JP 2008-161516 filed in the Japan Patent Office on Jun. 20, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
a host processing apparatus configured:
to identify one or more basic blocks of binary or assembly code, the binary or assembly code being for a target processing device; and
to generate, with reference to the one or more basic blocks, timed software for cooperative verification of hardware and software of a semiconductor device mounted with the target processing device and an operating system (OS),
wherein the timed software identifies locations for time information,
wherein the timed software comprises source code in a high-level language, the source code corresponding to the binary or assembly code,
wherein the high level language is a C language, and wherein the host processing apparatus is further configured to recognize a branch start/end command in the binary or assembly code, to insert updated time information in a C file, to convert the branch start/end command into the C language, to output the converted branch start/end command to the C file, and to start processing another of the one or more basic blocks.

2. The data processing apparatus according to claim 1, wherein the host processing apparatus is further configured to obtain time information for the binary or assembly code, and wherein the timed software further includes the time information at the identified locations.

3. The data processing apparatus according to claim 1, wherein
the host processing apparatus is further configured to recognize a function start command in the binary or assembly code, to convert a portion of the binary or assembly code into a definition of a C function, to output the converted portion to the C file, to insert other time information in the C file, and to start processing another of the one or more basic blocks.

4. The data processing apparatus according to claim 1, wherein the host processing apparatus is further configured to recognize a function end command in the binary or assembly code, insert other updated time information in the C file, convert the function end command into the C language, and output the converted function end command to the C file.

5. The data processing apparatus according to claim 1, wherein the host processing apparatus is further configured to convert a command other than a branch start/end command, a function start command, or a function end command into the C language, and to output the converted command to the C file.

6. The data processing apparatus according to claim 1, wherein the time information comprises cycle number information.

7. The data processing apparatus according to claim 1, wherein the host processing apparatus is configured to identify the one or more basic blocks based at least in part on an assembler for the target processing device.

8. The data processing apparatus according to claim 1, wherein a basic block is a basic unit for calculating information concerning time.

9. A data processing method comprising, with at least one processing unit executing stored program instructions:
identifying one or more basic blocks of binary or assembly code, the binary or assembly code being for a target processing device; and
generating, with reference to the one or more basic blocks, timed software for cooperative verification of hardware and software of a semiconductor device mounted with the target processing device and an operating system (OS),
wherein the timed software identifies locations for time information,
wherein the timed software comprises source code in a high-level language, the source code corresponding to the binary or assembly code,
wherein the high level language is a C language, and
wherein the method further comprises recognizing a branch start/end command in the binary or assembly code, inserting updated time information in a C file, converting the branch start/end command into the C language, outputting the converted branch start/end command to the C file, and starting processing of another of the one or more basic blocks.

10. The method of claim 9, further comprising obtaining time information for the binary or assembly code, wherein the timed software further includes the time information at the identified locations.

11. The method of claim 10, wherein the time information comprises cycle number information.

12. The method of claim 9, wherein identifying the one or more basic blocks comprises analyzing information associated with an assembler for the target processing device.

13. A non-transitory computer-readable storage medium storing computer-executable instructions that, when executed by a computer, cause the computer to perform a method comprising:
identifying one or more basic blocks of binary or assembly code, the binary or assembly code being for a target processing device; and
generating, with reference to the one or more basic blocks, timed software for the cooperative verification of hardware and software of a semiconductor device mounted with the target processing device and an operating system (OS),
wherein the timed software identifies locations for time information,
wherein the timed software comprises source code in a high-level language, the source code corresponding to the binary or assembly code,
wherein the high level language is a C language, and
wherein the method further comprises recognizing a branch start/end command in the binary or assembly code, inserting updated time information in a C file, converting the branch start/end command into the C language, outputting the converted branch start/end command to the C file, and starting processing of another of the one or more basic blocks.

14. The storage medium of claim 13, wherein the method further comprises obtaining time information for the binary or assembly code, wherein the timed software further includes the time information at the identified locations.

15. The storage medium of claim 14, wherein the time information comprises cycle number information.

16. The storage medium of claim 13, wherein identifying the one or more basic blocks comprises analyzing information associated with an assembler for the target processing device.

* * * * *